United States Patent

Huebner et al.

(10) Patent No.: US 9,670,783 B2
(45) Date of Patent: Jun. 6, 2017

(54) BLADE OF A TURBOMACHINE, HAVING PASSIVE BOUNDARY LAYER CONTROL

(75) Inventors: Norbert Huebner, Dachau (DE); Matthias Franke, Germering (DE)

(73) Assignee: MTU Aero Engined GmbH, Munich (DE)

( * ) Notice: Subject to any disclaimer, the term of this patent is extended or adjusted under 35 U.S.C. 154(b) by 1102 days.

(21) Appl. No.: 13/700,691

(22) PCT Filed: May 12, 2011

(86) PCT No.: PCT/DE2011/001066
§ 371 (c)(1),
(2), (4) Date: Feb. 11, 2013

(87) PCT Pub. No.: WO2011/147401
PCT Pub. Date: Dec. 1, 2011

(65) Prior Publication Data
US 2013/0287579 A1 Oct. 31, 2013

(30) Foreign Application Priority Data

May 28, 2010 (DE) .................. 10 2010 021 925

(51) Int. Cl.
*F01D 5/14* (2006.01)

(52) U.S. Cl.
CPC ............. *F01D 5/145* (2013.01); *Y02T 50/673* (2013.01)

(58) Field of Classification Search
CPC ...... F01D 5/145; F01D 5/141; F05D 2240/30; F05D 2240/306
See application file for complete search history.

(56) References Cited

U.S. PATENT DOCUMENTS

| 4,822,249 A * | 4/1989 | Eckardt ................. F01D 5/145 416/235 |
| 7,207,772 B2 | 4/2007 | Johann |
| 2005/0214113 A1 | 9/2005 | Johann |
| 2011/0182746 A1 | 7/2011 | Fiala et al. |
| 2012/0291874 A1* | 11/2012 | Tanaka ................. F01D 5/145 137/13 |

FOREIGN PATENT DOCUMENTS

| DE | 33 25 663 A1 | 1/1985 |
| DE | 10 2008 033 861 A1 | 1/2010 |
| EP | 0 132 638 A2 | 2/1985 |

(Continued)

OTHER PUBLICATIONS

Zhang et al (Journal or Turbomachinery—Jul. 2006—vol. 128—pp. 517-527).*

(Continued)

*Primary Examiner* — Craig Kim
*Assistant Examiner* — Juan G Flores
(74) *Attorney, Agent, or Firm* — Crowell & Moring LLP

(57) ABSTRACT

A blade of a turbomachine is disclosed. A contour variation is provided on the suction side of the blade, where the contour variation has a negative step as viewed in a direction of flow. The step has a stepped surface extending perpendicularly to a contour of the suction side and the contour variation has a tangential surface which leads upstream tangentially on the contour of the suction side starting from a step edge.

8 Claims, 3 Drawing Sheets

(56) References Cited

FOREIGN PATENT DOCUMENTS

EP  1 081 332 A1  3/2001
EP  1 326 382 A1  7/2003

OTHER PUBLICATIONS

Xue Feng Zhang, et al., "Separation and Transition Control on an Aft-Loaded Ultra-High-Lift LP Turbine Blade at Low Reynolds Numbers: Low-Speed Investigation", Journal of Turbomachinery, Jul. 2006, vol. 128, pp. 517-527.
PCT/DE2011/001066 PCT/ISA/210, dated Nov. 4, 2011, 3 pages.
German Search Report, dated Jan. 21, 2011, 4 pages.

* cited by examiner

BLADE OF A TURBOMACHINE, HAVING PASSIVE BOUNDARY LAYER CONTROL

This application claims the priority of International Application No. PCT/DE2011/001066, filed May 12, 2011, and German Patent Document No. 10 2010 021 925.8, filed May 28, 2010, the disclosures of which are expressly incorporated by reference herein.

BACKGROUND AND SUMMARY OF THE INVENTION

The invention relates to a blade of a turbomachine having passive boundary layer control.

Blades with passive boundary layer control are used to increase efficiency in the case of rotors of low-pressure turbines of an aircraft engine, for example. The boundary layer forms the transition area between the almost frictionless external flow of the fluid and the blade surface, in which the friction of the fluid along the surface determines the velocity profile perpendicular to the surface. It is laminar for low Reynolds numbers and turbulent for sufficiently large Reynolds numbers, with its thickness increasing in the direction of flow. The transition from the laminar boundary layer to the turbulent boundary layer is called the transition interval and is a function of various influencing variables such as surface roughness, velocity disturbances, and pressure irregularities of the external flow, as well as of the local Reynolds number. In the transition interval, which is located, as FIG. 1 shows, downstream from a channel narrow point 2 between two adjacent blades 4, 6, a separation bubble 8 forms, as a result of which the forward flow 10 is no longer able to follow the blade surface 12. As the Reynolds number drops, the separation grows increasingly in length and density until it extends downstream over a profile trailing edge or flow-off edge 14, so that the fluid particles are no longer able to follow the profile contour. The flow breaks away. This leads to appreciably larger losses and changes the outflow angle of the array. In an array assembly, e.g., multi-stage turbines, this produces faulty inflows and therefore additional losses in the arrays remote from the flow.

In order to have a positive influence on the separation behavior of the flow along a profile and on the profile loss, different approaches have been pursued in the prior art for arranging fixed turbulators or contour variations, by means of which the laminar boundary layer is supposed to be converted to a turbulent boundary layer further upstream on the profile, so that the boundary layer becomes higher in energy and is more easily able to follow the profile contour. Two examples of these types of turbulators are depicted in the enclosed FIG. 2. Consequently, there is the possibility of designing a turbulator by a linear protruding edge 16 on the profile suction side 12 or by a linear step-back 18 in the profile suction side 12, in order to enrich the boundary layer 10 with additional energy. Similarly, it is known from Document EP 0 132 638 A2 to provide the protruding edge with a serrated profile in a plane tangential to the profile suction side. In addition, it is also known from Document EP 1 081 332 A1 to increase the surface roughness of the profile suction side partially in a surface region. Furthermore, the applicant's Document DE 10 2008 033 861 A1 discloses that the profile suction side in one area may be provided with a wave contour extending in the direction of flow. In this case, it is disadvantageous that the position of the respective turbulator is optimized only for a narrow operating range. Thus, for example, the linear protruding edge is normally arranged at a distance from the profile leading edge which corresponds to 75% of an axial chord length of the profile. DE 10 2008 033 861 A1, on the other hand, proposes constructing the wave contour at a distance from the profile leading edge which corresponds to 40% to 90% of the axial chord length. EP 0 132 638 A2, on the other hand, proposes arranging the surface roughness at a distance from the profile leading edge which corresponds to 70% to 80% of the chord length. However, without knowledge of the profile, this cannot be converted with respect to the axial chord length.

The object of the present invention is creating a blade of a turbomachine having a passive boundary layer control which eliminates the aforementioned disadvantages and has an optimal position of a contour variation.

A blade of a turbomachine according to the invention, in particular a turbine blade of an aircraft engine, has, for deflecting a flow, a profile leading edge, a profile trailing edge and a profile suction side, and a profile pressure side extending between the profile leading edge and the profile trailing edge. For passive boundary layer control, the blade has a contour variation, which is situated, in accordance with the invention, directly downstream from a maximum speed maximum of the original blade profile. Due to the arrangement of the contour variation in this range, it is possible to control the boundary layer optimally over a large operating range with different Reynolds numbers in such a way that a transition of the laminar boundary layer takes place or the boundary layer is destabilized prematurely as a function of the geometry of the contour variation, with the latter leading to a preferred transition. At the same time, it is advantageous that the blade is simple to produce or can be mounted subsequently.

The term "directly" is understood in the case of one exemplary embodiment as a region of the profile leading edge which corresponds to approximately 50% to 85% of an axial chord length of the blade.

An especially favorable control of the boundary layer may be observed if the contour variation is located at a distance from the profile leading edge which corresponds to approximately 65% of the axial chord length.

In the case of one exemplary embodiment, the contour variation is designed as a negative step, as viewed in the direction of flow. This step has proven to be especially effective over a wide range of Reynolds numbers and is able to be produced simply and precisely both in the case of cast blades as well as blades that are manufactured generatively.

In the case of aircraft engines for passenger aircraft, Reynolds numbers usually occur for which the separation bubble forms on the profile suction side. In the process, an especially loss-reducing effect of the contour variation is observed if the step has a stepped surface extending perpendicularly to the original contour of the profile suction side and a tangential surface which leads upstream tangentially on the original contour starting from a step edge.

The step preferably has a step height k in the range of 0.1 mm to 0.4 mm. The step height k depends, among other things, on the local displacement thickness $\delta$ and on the Reynolds number Re2 in the outflow, especially optimal results being achieved, for example, with a step height of k=0.17 mm or k=15 mm with a Reynolds number of Re2th≤120,000 or Re2th=90,000. In this case, preferably with Reynolds numbers of Re2th≤120,000, a ratio k/$\delta$* of k/$\delta$*=47 mm applies between the step height k and a local displacement thickness $\delta$*. In the case of a Reynolds number of Re2th=90,000 with $\delta$*≈0.37 mm or in the case of Re2th=120,000 with δ*≈0.32 mm, step heights k are hereby established according to the order of magnitude.

Other advantageous exemplary embodiments of the present invention are the subject matter of the dependent claims.

A preferred exemplary embodiment of the present invention will be explained in greater detail in the following on the basis of the schematic drawing.

DETAILED DESCRIPTION OF THE DRAWINGS

Figure 1:
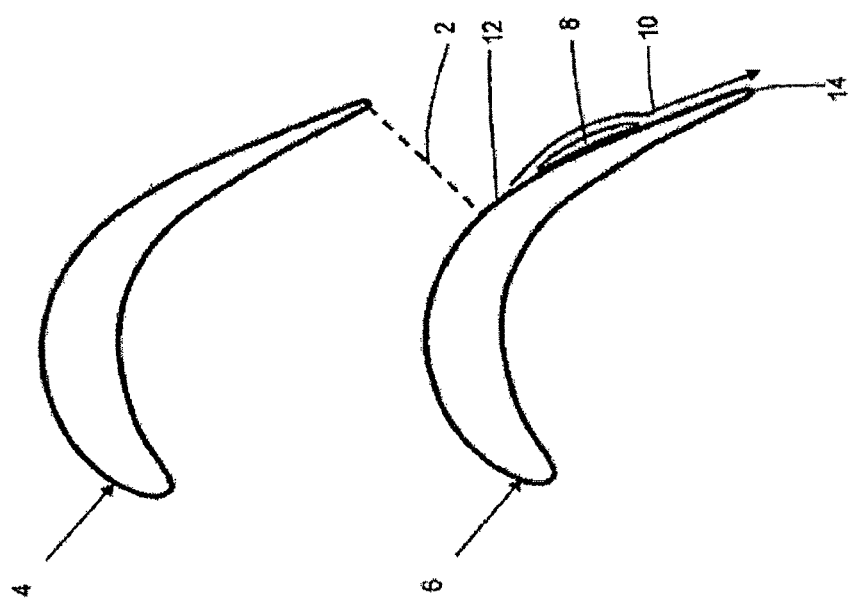
FIG. 1 shows a known blade array.
Figure 2:
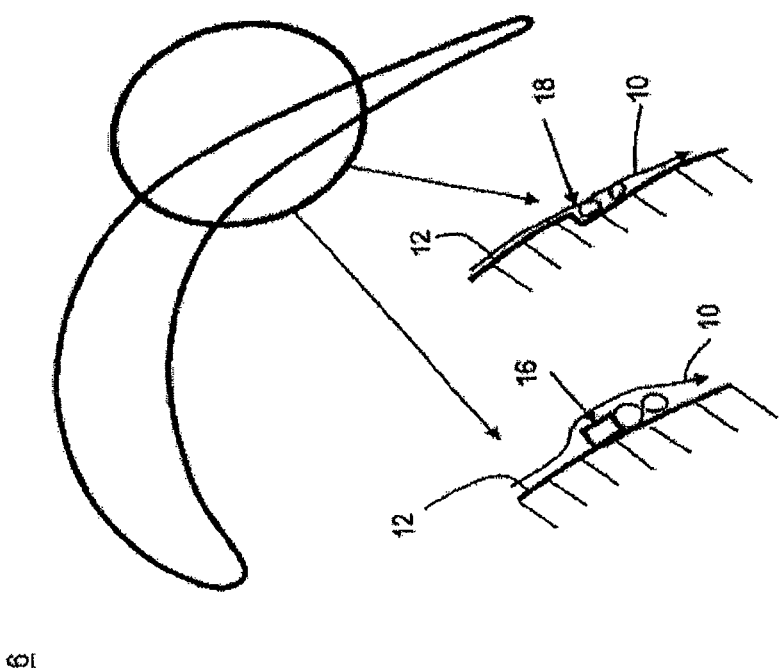
FIG. 2 shows known contour variations for passive boundary layer control.
Figure 3:
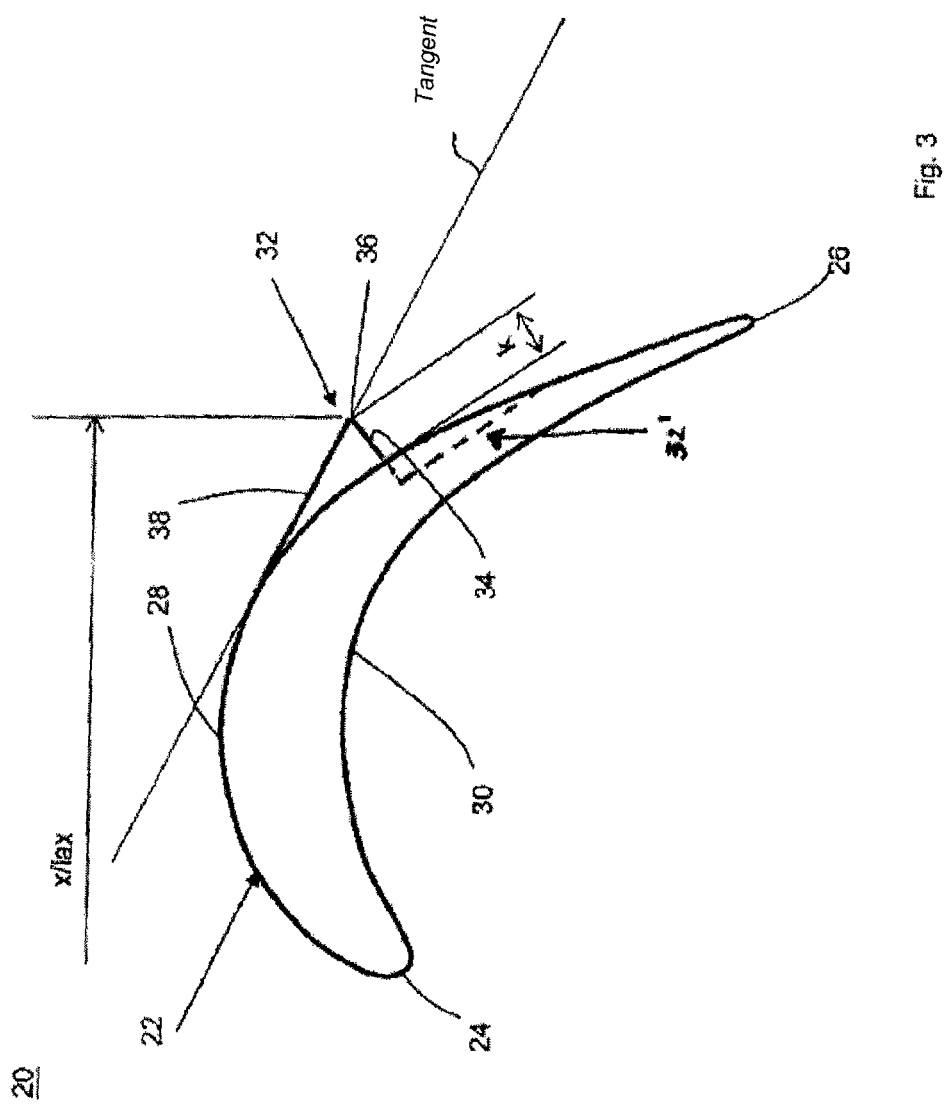
FIG. 3 shows a blade having a contour variation according to the invention.

According to the depiction in FIG. 3, a blade 20 of an aircraft engine blade according to the invention has, for example, in the region of the low-pressure turbine, a profile 22 having a profile leading edge 24, a profile trailing edge 26 and an essentially concave profile suction side 28 and an essentially convex profile pressure side 30 extending between the profile leading edge 24 and the profile trailing edge 26. For passive boundary layer control in the region of the suction side 28, the blade 20 has a turbulator or a contour variation 32 and 32'. The first turbulator 32 is a first embodiment of a contour variation. In this case, material has been applied to the original profile.

The second embodiment of the contour variation is reproduced in a second turbulator 32'. In this case, material has been removed from the original profile. A combination of these two embodiments is conceivable.

The turbulator 32 is arranged directly downstream from the speed maximum of the original profile 22 at x/lax≈0.65 or 65%, lax being the axial chord length. The turbulator 32, 32' may extend over the entire width of the blade or the blade orthogonally to the plane of projection and is constructed as a negative step, as viewed in the direction of flow. The turbulator 32, 32' has a flat stepped surface 34 extending perpendicularly from the original contour, and a tangential surface 38 extending upstream starting from a relatively sharp-edged step edge 36, which merges tangentially into the original contour. The geometry is continued over the entire height of the blade. The turbulator 32, 32' has a step height k of k=0.17 mm, which corresponds to an optimum step height k with a Reynolds number Re2th of Re2th=120,000.

The turbulator 32, 32' promotes an accelerated transition through an increased momentum exchange in the flow in the proximity of the wall. In particular, the step-like turbulator 32, 32' causes a rapid increase in the flow cross-section downstream from the step edge 36, which leads to a strong acceleration of the flow at the step edge 36 and to a premature destabilization of the laminar boundary layer and therefore to a preferred transition on the profile suction side 28. A direct boundary layer transition at the turbulator 32 does not take place and, instead, the natural transition is shifted upstream.

The positive loss-reducing effect of the turbulator 32 is preserved starting from low Reynolds numbers up to high Reynolds numbers, which are basically characterized by a diminishing potential for improving the suction-side separation behavior. Thus, at a Reynolds number of Re2th=200,000, the turbulator 32 is observed to have a clear upstream effect with respect to the transition. Even at Reynolds numbers of Re2th>200,000, a premature transition and therefore a loss-reducing effect are achieved.

Disclosed is a blade of a turbomachine, in particular a turbine blade of an aircraft engine, for deflecting a flow, the blade comprising a contour variation for passive boundary layer control, wherein the contour variation is arranged directly downstream in the range of a maximum speed maximum of the original profile.

The invention claimed is:

1. A blade of a turbomachine, comprising:
   a leading edge;
   a trailing edge;
   a suction side and a pressure side extending between the leading edge and the trailing edge; and
   a contour variation on the suction side, wherein the contour variation has a negative step as viewed in a direction of flow, wherein the step has a stepped surface extending perpendicularly to a contour of the suction side, wherein the contour variation has a tangential surface which leads upstream tangentially on the contour of the suction side starting from a step edge, and wherein the tangential surface merges tangentially into the contour of the suction side, and wherein there is an angle less than 90° between the tangential surface and the stepped surface.

2. The blade according to claim 1, wherein the contour variation is located at a distance from the leading edge which corresponds to approximately 50% to 85% of an axial chord length of the blade.

3. The blade according to claim 1, wherein the contour variation is located at a distance from the leading edge which corresponds to approximately 65% of an axial chord length of the blade.

4. The blade according to claim 1, wherein the step has a step height in a range of 0.1 mm to 0.4 mm.

5. The blade according to claim 1, wherein the step has a step height of 0.17 mm.

6. The blade according to claim 1, wherein the step has a step height of 0.15 mm.

7. The blade according to claim 1, wherein the contour variation is obtained by applying material to, or removing material from, the blade.

8. The blade according to claim 1, wherein the blade is a turbine blade of an aircraft engine.

* * * * *